United States Patent [19]
Smith, Jr.

[11] Patent Number: 5,589,814
[45] Date of Patent: Dec. 31, 1996

[54] ANTI-THEFT VEHICLE SECURITY SYSTEM

[76] Inventor: John Smith, Jr., 2635 Sawmill Rd., N. Bellmore, N.Y. 11710

[21] Appl. No.: 369,217

[22] Filed: Nov. 14, 1994

[51] Int. Cl.$^6$ .................................................. B60K 25/10
[52] U.S. Cl. ........................ 340/426; 340/425.5; 340/430; 340/480; 340/482; 340/484; 340/485; 116/42; 116/43; 116/44; 116/45; 116/46; 307/10.2
[58] Field of Search ................................ 340/425.5, 426, 340/430, 480, 482, 484, 485; 116/42, 43, 44, 45, 46; 307/10.2

[56] References Cited

U.S. PATENT DOCUMENTS

| | | | |
|---|---|---|---|
| 1,237,104 | 8/1917 | Schumacher | 296/84.1 |
| 3,695,681 | 10/1972 | Dockery | 296/96.19 |
| 5,258,741 | 11/1993 | Fuller | 340/426 |
| 5,398,016 | 3/1995 | Burayez | 340/426 |

*Primary Examiner*—Jeffery Hofsass
*Assistant Examiner*—Dary L. C. Pope
*Attorney, Agent, or Firm*—Galgano & Burke

[57] ABSTRACT

Considering the latest vehicle anti-theft systems and anti-theft warning systems that abound today, the theft of vehicles has not been slowed down to any appreciable amount. In fact, the car theft industry has virtually kept pace with the car manufacturing industry. This invention has taken a common sense and practical approach to an anti-vehicle theft system that renders the front windshield opaque when the ignition switch is turned on and the vehicle is attempted to be stolen, while the security control switch is placed in the "on" mode. One embodiment was a thermopane type windshield with a space between two plates of unbreakable glass. The space between the two plates of glass has an opaque curtain or blind pulled up inside the void space from the bottom of the windshield to the top of the windshield to render the entire windshield opaque. Another embodiment is to provide several optional features that may be purchased by persons with limited funds although these options are not really required. These options greatly enhance the effectiveness, efficiency and integrity of the basic security system. These features are entirely independent of each other and in no way do they hinder the operation of the basic security system.

9 Claims, 2 Drawing Sheets

ANTI-THEFT VEHICLE SECURITY SYSTEM

BACKGROUND OF THE INVENTION

Vehicle Theft is a major industry and many security systems have been devised in the past. However; the present invention represents a vast departure from existing security systems and is virtually foolproof and failsafe. The term "failsafe" literally means that the Anti-Theft Vehicle Security System is safe from failing.

Dating back to 1891 the first American manufactured automobile was introduced, although the first automobile invented dates back several centuries ago.

During the interim a tremendous amount of time and money was expended on every conceivable feature of every conceivable part of the automobile. Strict attention was paid to a new streamlined design, speed, material, fuel, etc. Today's automobile represents the highest degree of aesthetics, engineering and aerodynamics that engineering and the sciences can produce. Considering that every time a new vehicle anti-theft security system and/or warning system is developed, a new theft device or method follows shortly thereafter to override the new anti-theft system. Consequently, the theft of vehicles has not been slowed down to any appreciable degree. In fact, the vehicle theft industry has virtually kept pace with the car manufacturing industry.

With reference to U.S. Pat. Nos. 1,237,104, Aug. 14, 1917, Schumacher, 3,695,681 Oct. 3, 1970, Dockery, 5,117, 217, May 26, 1992, Nykerk and 3,703,703, Oct. 21, 1972, Payne, the following comments are noted:

Although Schumacher does disclose a movable screen which is intended to slide over the front windshield and it is not intended to be moved or activated during a theft or robbery via operation of the ignition switch. The screen is manually moved and padlocked prior to the driver of the car leaving it unattended.

Similarly, the Dockery reference, while it does relate to the use of a liquid between two window panes which can vary its transparency, this is clearly not intended for providing a completely opaque screen during a robbery attempt.

While the Nykerk system and the Payne system do provide for any automatically conditional system to give alarm of an impending theft of a vehicle, neither one of the systems provide for a means to render the windshield opaque.

The Payne system is a Vehicle Theft Signalling Device which comprises a vehicle dome light with a signal transmitting device which is activated by tampering of the ignition, application of broken or starting mechanism applied with a locking system for locking the doors and windows of the vehicle to trap the thief. The signal transmitter is tuned to a wrist-carried bracelet receiver unit which has a light signal responsive to the transmission of signals from the transmitter. The bracelet unit is adapted to be manually activated to light, for alerting the police force of an impending criminal activity.

The Nykerk system has an alarm system for sensing and vocally warning a person to step back from a protected object. This is clearly a proximity detector that senses the proximity of a person to the protected object and means for generating vocal signals using synthetic speech generation circuits. Such vocal signals instruct the person to back away from the protected object or an alarm will be given, such as an audible alarm or the Police Station being notified.

In this system there are at least three synthetic speech vocal messages warning the person to step back from a protected object or an alarm will be issued. Fifteen (15) seconds each plus a verbal countdown will be given. It consists of a fully automatic and electronic system which requires nineteen (19) pages of drawings which includes several hundred sketches and drawings. It is by far the most expensive system devised and most probably requires schooling to learn how to place the system in an operating mode.

It does not represent the slightest bit of rendering the windshield opaque such as the invention which I describe in the ensuing portion of the description of my invention.

SUMMARY OF THE INVENTION

My invention represents a totally efficient and effective vehicle anti-theft security system that cannot be stolen, as will be pointed out in the ensuing description of the invention. The invention is contemplated to be the best possible vehicle anti-theft security system that exists today. However; I wish to point out that the vehicle cannot be stolen, except by towing it away or placing it on a truck by crane and driving the truck away.

This invention specifies vast improvement and processes that are necessary but were lacking in a similar invention developed over seventy-six (76) years ago by Margarita Schumacher of Los Angeles, Calif., serial #1,237,104 and patented in Aug. 14, 1917. Both Schumacher's and my invention provide the only practical means that a vehicle cannot be stolen.

As pointed out in paragraph one (1) above, this invention can unequivocally prevent the theft of vehicles.

Referring back to a totally effective and efficient anti-vehicle theft system, the irony is that the solution is "Right in Front of Our Eyes" every time we sit behind the steering wheel of a vehicle. The solution is to provide a means that is adapted to completely covert the front windshield and render it opaque. The plain and simple solution is, if we cannot see the road in front of us, we cannot drive the vehicle, nor can a thief steal the vehicle.

This invention, unlike most anti-vehicle theft inventions, provides a new dimension and a new approach to the theft of vehicles. It represents a vastly different type of anti-theft vehicle security system that has been invented since the invention of the automobile.

This is a vastly improved anti-theft system over the many different types of high-tech inventions using various devices that are costly to manufacture, install and maintain. These systems still cannot provide the type of effectiveness and efficiency that is required for a failsafe security system that the average car owner can afford.

This invention includes a basic anti-theft system as well as several optional features that can be purchased separately or as a total system. These optional systems greatly enhance the effectiveness of the basic security system. They are entirely independent of each other and do not hinder the operation of the basic system. The optional features will be discussed later.

The basic anti-theft system is unique itself due to the simplicity of design and use of the vehicles standard features which result in a tremendous cost reduction that the vehicle owner can benefit by. Together with the basic security system, the optional systems can practically guarantee the desired results, but are not actually required to be purchased. The basic anti-theft system is all that is required. The optional systems are more capable to provide an orderly, efficient integration and operation with other elements in the security system.

The invention relates to an anti-theft vehicle security system and more particularly, to a system that renders the front windshield opaque if the vehicle is attempted to be stolen when the ignition switch is turned on and the security control switch is set to be in the "On" mode.

This invention consists of an anti-theft security thermopane windshield device for a vehicle of the type having a front windshield which has an opaque shield or blind adapted to cover the windshield. The embodiment uses a thermopane type windshield with a space between two plates of glass. An opaque window blind or curtain is pulled upward in the void space off of a bottom, horizontal steel roller and is guided upward in left and right tracks to the top of the windshield where it is fastened to a top revolving steel horizontal roller. The side tracks are steel channels fastened to the window jamb where they come in contact with the thermopane windshield.

The opaque curtain is motor-controlled and automatically stops the curtain when it reaches the top of the windshield as well as the bottom of the windshield when the curtain is lowered.

When the windshield curtain reaches the top of the windshield it renders the windshield opaque and the driver cannot see the roadway in front of him/her. Consequently, the vehicle cannot be driven and therefore the vehicle cannot be stolen. A legend is printed on the opaque curtain stating that "This Vehicle Is In The Process Of Being Stolen! CALL POLICE!" There is no way that the thief can gain access to the opaque curtain, as it is trapped between the two plates of glass which is sealed on all four sides. One of the optional features provides for a second set of door locks to lock all the doors when the vehicle ignition switch is turned on.

It is a foregone conclusion that the opaque curtain being automatically pulled upward or downward by a motor control rather than manually by the driver of the vehicle is a vastly improved new method for a vehicle anti-theft system. Therefore, by virtue of utilizing a motor control unit rather than a manual system, it should be considered a new and major improvement that should warrant patentability.

An improvement such as this should undeniably be considered as a claim. Since this invention is of such great magnitude it would affect millions of vehicle owners if patented. This would result in a significant reduction of insurance premium costs as well as having a potential for the saving of life and limb. Most important it would significantly reduce the theft of vehicles. This in turn would result in vehicular theft becoming a crime of the past. The ramifications to worldwide law enforcement agencies and economics defies description.

A principal object of the invention is to provide a new direction for a vastly improved anti-theft vehicle security system by offering a low-cost system; due to simplicity in design. This results in greater cost effectiveness and cost reductions. Another factor in reducing costs is by the use of existing, standard features of the car and off-the-shelf component part as well as lessening the need to design and manufacture special parts.

Another object of the invention is to provide a new and improved anti-theft vehicle security system having the means to make the front windshield opaque. A means is provided to have a pliable and resilient curtain or blind to be pulled up in the void space between two plates of glass. The curtain is inaccessible to the would-be thief so that the thief cannot get at the curtain to render it inoperable. The opaque curtain is captured in between the two plates of glass which are sealed on all sides of the windshield, except for a ⅛" slot running horizontally for the full length of the top and bottom of the windshield. The opaque curtain is pulled off a horizontal steel roller and enters the void space at the bottom of the windshield between the two plates of glass via a ⅛" slot at the top of the bottom roller, extending the fill length to the roller.

Another object of the invention is to provide the opportunity for those persons with limited funds to possibly purchase one or more optional systems. The various options enhance the viability of the security system but do not endanger the effectiveness of the basic security system.

A unique object of the invention is to trap the thief inside the locked vehicle when he/she enters the vehicle, closes the door behind him/her, and turns on the ignition switch when the security control switch is in the "On" mode.

Another object of the invention is to provide the means to exactly pinpoint the location of the vehicle that is in the process of being stolen - immediately - even though it is in a crowded parking lot at night.

Referring to the above: To provide the means for a smoke generator or smoke bomb to be triggered to release a red-colored, harmless and safe smoke. The smoke generator is located under the front hood in an inconspicuous place. A cloud of smoke seeps out from underneath the dashboard when the ignition switch is turned on while the security control is in the "On" mode.

In this invention the thermopane windshield is the main feature. Since the thermopane windshield is a standard feature of the vehicle there is no charge added to the vehicle anti-theft system. This reduces the overall cost of the security system substantially.

Referring back to a totally effective and efficient anti-crime theft system, the irony is that the solution, as the saying goes, is right under our noses. However; in this case the solution is right "In Front Of Our Eyes" every time we sit behind the steering wheel of a vehicle.

A final objective of the ideal vehicle anti-crime theft security system is one that includes a guaranteed security system within the restraints of efficient manufacturing, proper installation of mechanical electrical features; proper installation of all component parts and most important is a cost-effective system. It goes without saying that unorthodox theft systems are not used such as picking up the vehicle by a crane and placing it on a flatbed truck to be driven away or towed away.

The following summarizes the optional systems:
1. Installation of the smoke generator.
2. Trap the would-be thief inside of the car when a second set of door locks are activated.
3. Installation of a tape cassette playing a song entitled "Smoke Gets in Your Eyes".

Even if the optional features are not purchased, they serve as an excellent deterrent to the intruder after the invention becomes well-known.

BRIEF DESCRIPTION OF THE DRAWINGS

Sheet One (1) of Two (2)

FIG. One (1) is a front view of the windshield looking inward. It shows the opaque curtain in an "up" position so that the driver cannot see the road in front of him.

FIG. Two (2) is a side view of a vehicle. It shows the smoke generator and the smoke seeping into the interior of the vehicle from underneath the dashboard. It also shows the extra car door locks.

Sheet Two (2) of Two (2)

Figure 1:
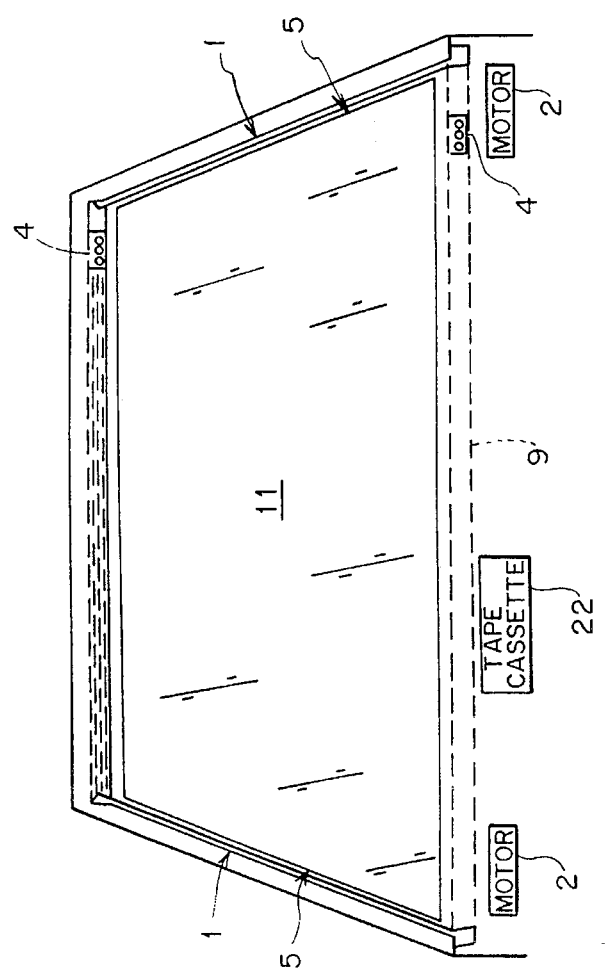
Figure 2:
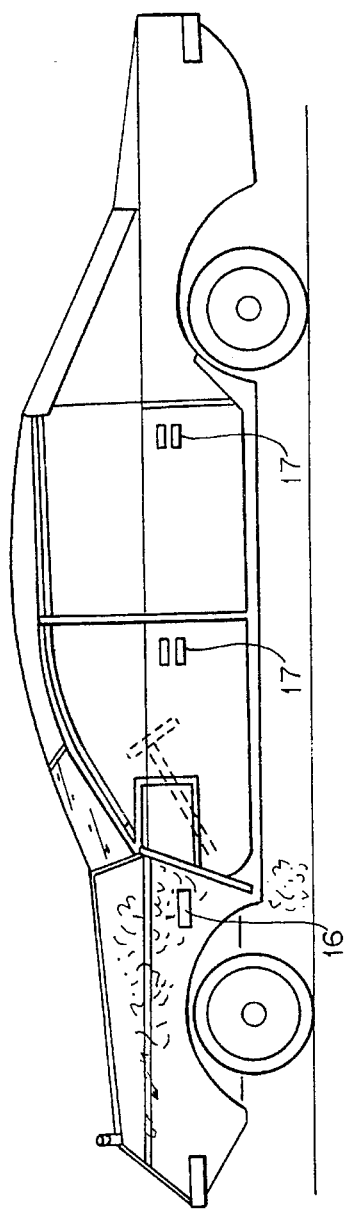
Figure 3:
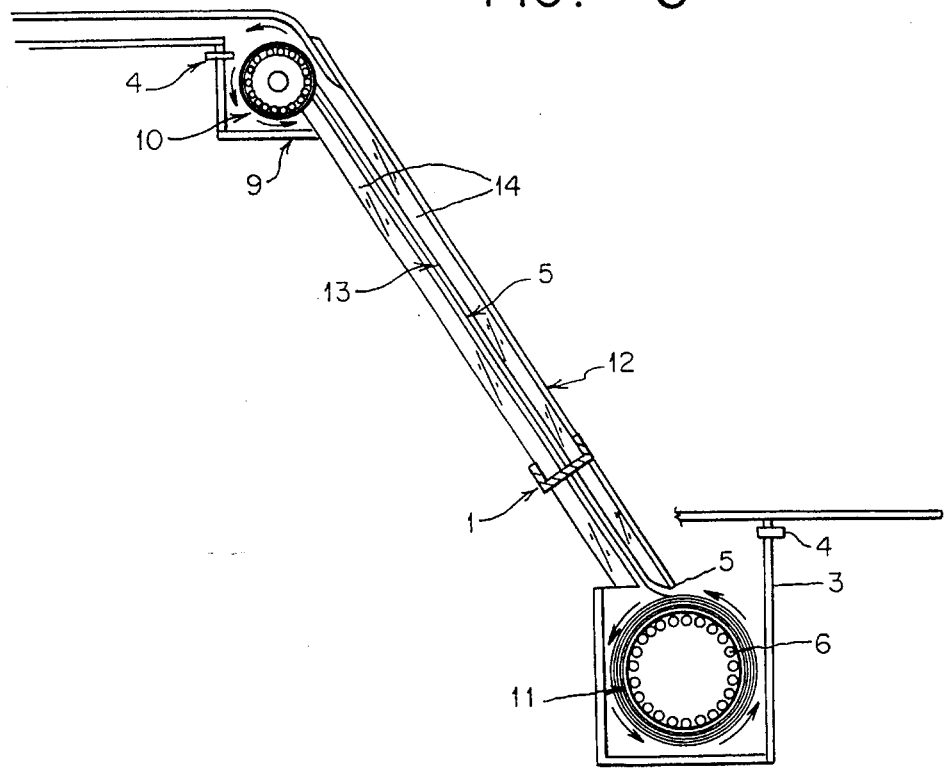
Figure 4:
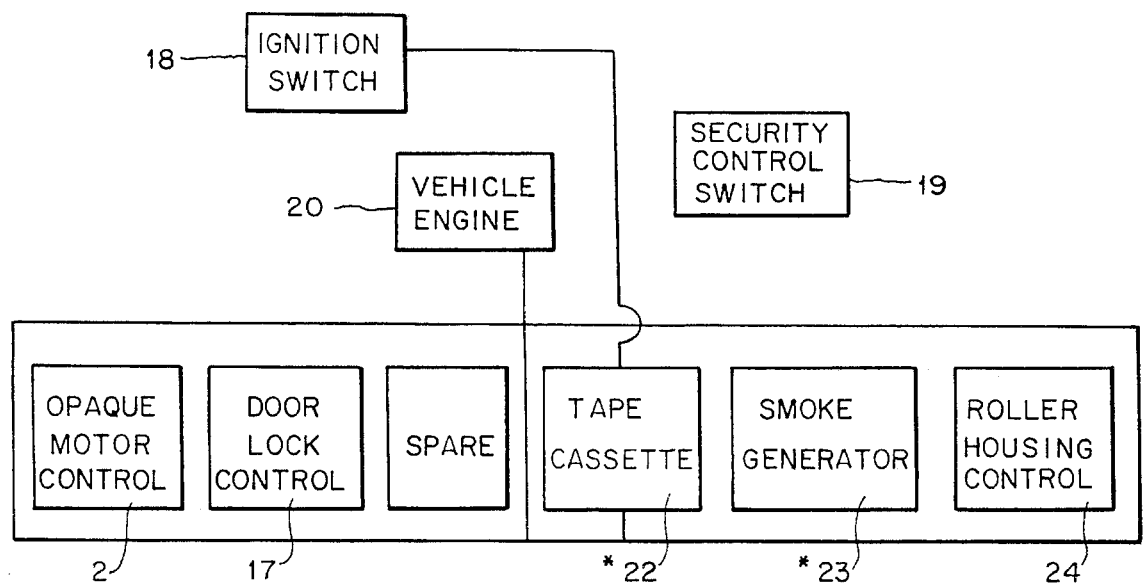

FIG. Three (3) is a sectional view of FIG. 1 and shows the thermopane window with the opaque material rolled up on the bottom steel roller with the flexible steel wire fastened to the curtain and leading up to and inside of the steel channel and fastened to the top roller.

It also shows the steel enclosures in which the rollers are contained with one side of the enclosure being made removable by the use of a computer button control lock. In addition, it shows the steel channels which act as guides for the opaque curtain to be pulled upward and wrapped around the top roller with a few turns to keep the opaque curtain taut and wrinkle-free.

Sheet Three (3) of Three (3)

FIG. Four (4) is a schematic circuit diagram.

DETAILED DESCRIPTION OF THE INVENTION

FIG. One (1), Sheet One (1) of the drawings is a front view of a thermopane windshield showing the opaque curtain (11) pulled up to the top of the windshield, in the void space (13). The view is also looking outward from the inside of the vehicle and the roadway cannot be seen. It also shows the bottom and top steel rollers (6 and 10) with the motors (2) that pull the opaque curtain (11) up or down at a rate of approximately eight inches (8") per second and stops the opaque curtain (11) in position either at the top or bottom of the windshield, which is operated by an electric timer on the motors.

FIG. Two (2) is a side view of the entire vehicle with a small amount of black (15) smoke seeping into the interior of the vehicle from underneath the dashboard. The thief begins to panic thinking that the car is on fire. It shows the smoke generator (16) adjacent to the side of the engine. It also shows the door locks (17). When the thief tries to get out of the vehicle he finds that the doors are locked. There is virtually no way that a thief can gain access to the opaque curtain to render the curtain inoperable as it is trapped in between the two plates of glass (14), which is sealed at the four edges, as well as the sides of the opaque curtain (11) being partially inside of the one-quarter inch (¼") steel channel which also acts as a guide for the opaque curtain (11) as it travels upward or downward.

FIG. Three (3) is a cross-sectional view of FIG. One (1). It shows the two plates of glass (14) separated by a one-quarter inch (¼") void space (13) in which the opaque curtain (11) travels upward and/or downward. The time required for the opaque curtain to travel in either direction is approximately three (3) seconds.

FIG. Three (3) also shows the bottom roller (6) fully loaded with the opaque curtain (11). It also shows an approximately one-sixteenth inch (¹⁄₁₆") soft, pliable wire (5) which is fastened to the front end of the opaque curtain (11) and extending upward in the one quarter inch (¼") steel channel (5) where it is fastened to the top roller (10) with about three or four turns of wire wrapped around the top roller and three or four turns of the opaque curtain also wrapped around the roller. Provisions are made to have one end of each roller fitted with ball bearing (7) rollers to permit the roller to freely rotate under a slight amount of tension. The opposite end of the roller is freely rotatable so that it does not bind as the opaque curtain (11) travels upward and/or downward. This is strictly a design choice.

Each roller is housed in a case hardened housing (8a) with one face made removable to permit maintenance of the roller units. Computer button controls are used to open or close the lock.

FIG. four (4) of the drawings shows a circuit wiring diagram of the control system showing the vehicle engine switch (20) which is connected to the vehicle engine in a normal position. When the security control switch (19) is moved in the security position (11), the ignition switch (18) will not only turn on the engine (20), but it will also energize the following controls: The Door Lock (17); Windshield Opaque Curtain; Control (2); Tape Cassette Control (22); Smoke Generator Control (23) and the Roller Housing Control (24).

As previously mentioned an important embodiment of this invention provides several optional features that may or may not be purchased by persons with limited funds. Those options greatly enhance the effectiveness, efficiency and integrity of the basic security system. Furthermore, those options are entirely independent of each other and in no way do they hinder the operation or efficiency of the basic anti-theft security system.

The security system effectively prevents theft of automobiles and trucks. It prevents the perpetrator from seeing the roadway through the front windshield. If the driver cannot see where he/she is going the vehicle cannot be stolen. Simultaneously the perpetrator will be trapped inside the locked vehicle when a secondary set of door locks are automatically triggered.

When the perpetrator turns the ignition switch on, smoke begins to seep into the interior of the vehicle after approximately fifteen (15) seconds. When the perpetrator opens the door to get into the vehicle a tape cassette starts to play a song entitled "Smoke Gets in Your Eyes" at an abnormally loud volume. The reason for this is to have the thief close the door quickly to shut out some of the volume of the music, as the door must be closed in order to trigger the door lock control to lock the doors. The abnormally loud music is a ploy to induce the thief to close the door quickly, for fear of drawing the public's attention.

An opaque curtain is pulled upward inside the void between the thermopane-type window; until it reaches the top of the windshield. A legend is painted on the front of the opaque curtain with the words "This Vehicle is in the Process of being Stolen. Call Police."

A small electric motors pull the opaque curtain upward from the bottom of the windshield. The opaque curtain is fully wound around a steel roller located just under the bottom of the windshield which rotates as the curtain is being pulled upward. It is stopped when it reaches the top of the windshield where it is fastened to the end of the pliable wire which is measured to the exact height of the windshield. The pliable wire is fastened to the top roller, then fastened to the curtain.

The opaque curtain material is approximately 8 mils thick. This method is contemplated as being the best method to use rather than injecting the void spaces between the two plates of glass with water dyed black, an opaque-colored smoke or gas. The first two methods most likely will leave an objectionable residue on both faces of the glass that forms the void space. However, it does not necessarily eliminate other types of material. The main purpose is to render the void space opaque and leave both faces of the glass that forms the void space perfectly clean.

The security control system can be armed to be in an on/off mode using existing technology of coded numbers.

When the security control (19) is armed in the "On" position, and the ignition switch (18) is turned on, it triggers the following systems to be activated; namely, vehicle engine (20), tape cassette (22), door lock control (17), opaque curtain control 2, smoke generator (23) and the roller housing control (24).

The system is always armed in the normal "Off" mode except when the vehicle is left unattended at any time. When the system is armed in the "On" mode a small red button is turned on so that the driver of the car is alerted that the security control switch is armed. The red button is mounted on the front of the dashboard, directly in front of the driver. The computer control panel is mounted in the ceiling, directly over the driver's head.

When the security system is armed in the "On" mode and an unauthorized person turns the ignition switch on, the security system is activated and all of the security controls are triggered to go "On" in the order described above.

The code numbers prefixed with an asterisk (*) are only to be used with the optional systems. When the vehicle is being driven the security system cannot be triggered by installing a disarm lock on the computer button control panel. The lock is set prior to driving.

If the authorized driver makes the mistake of depressing the security control (19) button and turning on the ignition switch (18) when not warranted, he/she can disarm the security system immediately by turning off the ignition switch 18 and depressing the security control 19 button. This returns the vehicle to "normal" operation for driving.

It cannot be contested nor can it be denied that if the roadway cannot be seen from behind the steering wheel of a vehicle, the vehicle cannot be safely driven, nor can it be stolen. This is not intended as a claim to render the windshield opaque per se, but to provide a vastly improved system that is utilized to render the front windshield completely opaque; in which the vehicle is automatically conditioned to provide for an opaque curtain to completely obscure the roadway from being seen by the driver while sitting behind the steering wheel of the vehicle. If the driver cannot see the roadway, the vehicle cannot be driven safely, nor can it be stolen.

A similar invention was discovered over 76 years ago by Schumacher of Los Angeles, Calif., Ser. No.: 1,237,104; dated Aug. 14, 1917. That invention provided an opaque curtain to perform the same function as herein before outlined in my invention. Schumacher's invention included that the functions provided by my invention such as pulling an opaque curtain up or down manually and locking it in position by suitable padlock manually and not automatically.

It can readily be seen that the theft of vehicles is still ongoing as a thriving enterprise and the theft of vehicles has not slowed down to any appreciable degree. The reason is that the driver of the vehicle could see the roadway after he rendered the particular security device inoperable, no matter what kind of device was used by the manufacturer of the vehicle. For the past 76 years nobody has thought of rendering the vehicle front windshield non-see-through; which is the only conceivable common sense and practical system that provides the solution.

This invention is not a claim to render the front windshield opaque but to provide a vastly improved system to prevent vehicular theft as well as to provide a significant cost effective system, and to guarantee a vehicular anti-theft security system within the restraints of manufacturing defects and improper installation not considering the use of a crane or similar lifting device to pick the vehicle up off the street and place it on a flatbed truck and drive the truck away. The towing away of the vehicle is also excluded from the guarantee.

This invention is contemplated to be the most effective system and provides the only means to prevent the roadway from being seen through the windshield as he attempts to steal the vehicle when he turns the ignition switch on, thereby preventing him/her from stealing the vehicle. It is the only system that permits the vehicle manufacturer to guarantee that the vehicle cannot be stolen.

Another embodiment of the invention is to provide the means to have a smoke generator produce a red-colored smoke from underneath the front hood of the car when the ignition switch is turned on and the security system is set in the "On" mode. The smoke billows out from underneath the front hood of the vehicle and seeps inside of the vehicle. The thief believes that the engine is on fire and panics when he tries to get out of the vehicle and finds that the doors are locked. This permits the police to capture the thief in a nonviolent manner.

A legend is presented on the front of the opaque fabric alerting the public that the vehicle is not on fire, and not to call the fire department.

I claim:

1. An anti-theft security system for a motor vehicle, comprising:
    a double pane front windshield in a motor vehicle comprising two spaced-apart window panes defining a chamber therebetween, said chamber having a top end and a bottom end;
    an extensible and retractable opaque curtain positioned within said chamber for movement between a retracted position in which said curtain is retracted to allow an uninhibited driving view through said front windshield and an extended position in which said curtain extends from the top to the bottom of said chamber to block the driving view through said front windshield, said curtain being configured and dimensioned to generally span said chamber from said top end to said bottom end of said chamber and across the width of the same when in said extended position thereof;
    a control switch having an on position and an off position for arming and disarming said system;
    means for automatically moving said curtain from said retracted position to said extended position; and
    a trigger mechanism for activating said means for automatically moving said curtain upon activation of the trigger mechanism when said control switch is in an on position.

2. The anti-theft security system of claim 1, further comprising a trigger mechanism located within the vehicle which activates said means for automatically moving said curtain.

3. The anti-theft security system of claim 1, wherein said moving means comprises a motorized assembly including a first rotatable roller located in said bottom end of said chamber below said front windshield coupled to one end of said curtain, a second rotatable roller located in said top end of said chamber above said windshield coupled to an opposite end of said curtain, and a motor for driving at least one of said rollers, such that, when activated, said first roller and said second roller rotatingly cooperate in a first direction to move said curtain to said extended position thereby obscuring the view through said front windshield, and, such that, when deactivated said first roller and said second roller rotatingly cooperate in an opposite direction to move said curtain to said retracted position thereof.

4. The anti-theft security system of claim 3, wherein said curtain when in its deactivated position is coiled around said first roller, such that, when activated, said curtain partially uncoils from said first roller and moves towards said second roller to obscure said front windshield.

5. The anti-theft security system of claim 1, further comprising:

a smoke generator located within the vehicle; and.

wherein said trigger mechanism activates said smoke generator in conjunction with said means for automatically moving said curtain.

6. The anti-theft security system of claim 1, wherein said curtain has a legend displayed thereon informing authorities that the vehicle is being stolen.

7. The anti-theft security system of claim 1, wherein said curtain has a legend displayed thereon informing authorities that the vehicle is "not on fire".

8. The anti-theft security system of claim 3, additionally including a pair of spaced-apart guide tracks for guiding said curtain between said rollers during movement thereof between said retracted and extended positions.

9. The anti-theft security system of claim 2, additionally including an audible alarm activated by said trigger mechanism.

* * * * *